(12) United States Patent
Harllee, III et al.

(10) Patent No.: US 8,976,478 B1
(45) Date of Patent: Mar. 10, 2015

(54) BAND REWRITES BASED ON ERROR SCAN COUNTS

(71) Applicant: Seagate Technology LLC, Cupertino, CA (US)

(72) Inventors: Peter S Harllee, III, Boulder, CO (US); Timothy R Feldman, Louisville, CO (US); Jian Qiang, Singapore (SG); Utt Heng Kan, Singapore (SG); Wen Xiang Xie, Singapore (SG); Winahyu Aji Bimas, Singapore (SG); Poh Seng Lim, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/050,436

(22) Filed: Oct. 10, 2013

Related U.S. Application Data

(60) Provisional application No. 61/712,252, filed on Oct. 10, 2012.

(51) Int. Cl.
*G11B 5/09* (2006.01)

(52) U.S. Cl.
CPC ........................................ *G11B 5/09* (2013.01)
USPC ............................................................ 360/53

(58) Field of Classification Search
None
See application file for complete search history.

(56) References Cited

U.S. PATENT DOCUMENTS

| | | | |
|---|---|---|---|
| 8,108,595 B2 | 1/2012 | Araki | |
| 8,270,256 B1* | 9/2012 | Juang et al. | 369/13.01 |
| 8,385,162 B2 | 2/2013 | Rosen | |
| 8,516,341 B2 | 8/2013 | Kim | |
| 8,537,481 B1* | 9/2013 | Bandic et al. | 360/31 |
| 8,553,347 B2* | 10/2013 | Watanabe et al. | 360/62 |
| 8,583,879 B2* | 11/2013 | Na et al. | 711/154 |
| 2005/0071537 A1* | 3/2005 | New et al. | 711/100 |
| 2006/0232874 A1* | 10/2006 | Tsuchinaga et al. | 360/75 |
| 2010/0188767 A1 | 7/2010 | Hirose | |
| 2012/0082019 A1* | 4/2012 | Harigae | 369/53.41 |
| 2012/0162806 A1* | 6/2012 | Champion et al. | 360/53 |
| 2012/0162809 A1* | 6/2012 | Iida | 360/71 |
| 2012/0162814 A1* | 6/2012 | Kimizuka | 360/75 |
| 2012/0194946 A1* | 8/2012 | Watanabe et al. | 360/78.04 |

(Continued)

OTHER PUBLICATIONS

Lin et al, H-SWD: Incorporating Hot Data Identification into Shingled Write Disks, Department of Computer Science and Engineering, University of Minnesota—Twin Cities, Minneapolis, MN http://www-users.cs.umn.edu/~park/docs/MASCOTS12_SWD.pdf.

*Primary Examiner* — Peter Vincent Agustin
(74) *Attorney, Agent, or Firm* — Cesari & Reed LLP; Kirk A. Cesari; Christensen W. Best

(57) ABSTRACT

Systems and methods are disclosed for performing band rewrites on shingled storage media based on error scan counts. In one embodiment, a device may comprise a data storage medium including a first band and a processor. The first band may include a plurality of tracks storing data in a shingled manner where a first track at least partially overlaps a second track. The processor may be configured to receive a write command directed to the first band, increment a first rewrite count of the first band based on the write command, and when the first rewrite count exceeds a first rewrite threshold, perform a read-modify-write (RMW) operation for all of the first band. In some embodiments, a device may maintain write counts for sections of a band, and perform RMW operations on less than all of the band.

20 Claims, 8 Drawing Sheets

(56) References Cited

U.S. PATENT DOCUMENTS

| | | | |
|---|---|---|---|
| 2013/0028061 A1* | 1/2013 | Rosen et al. | 369/13.32 |
| 2013/0031406 A1* | 1/2013 | Cho | 714/6.1 |
| 2013/0242426 A1* | 9/2013 | Bandic et al. | 360/31 |

* cited by examiner

US 8,976,478 B1

BAND REWRITES BASED ON ERROR SCAN COUNTS

BACKGROUND

The present disclosure relates to data storage mediums, and provides systems and methods for improving data storage device performance, especially when using shingled magnetic recording.

SUMMARY

In one embodiment, a device may comprise a data storage medium including a plurality of bands and a controller. Each band may include a first region including a first plurality of tracks recorded in a shingled manner where a first track at least partially overlaps an adjacent track, and writing to tracks in the first region requires rewriting tracks in a second region, and the second region including a second plurality of tracks recorded in a shingled manner. The controller may be configured to increment a first rewrite count for the first region when a write event occurs on the first plurality of tracks, rewrite the first region and the second region when the first rewrite count exceeds a first rewrite threshold, increment a second rewrite count for the second region when a write event occurs on the second plurality of tracks, and rewrite the second region when the second rewrite count exceeds a second rewrite threshold.

In another embodiment, a device may comprise a data storage medium including a first band, the first band including a plurality of tracks storing data in a shingled manner where a first track at least partially overlaps a second track, and a processor configured to receive a write command directed to the first band, increment a first rewrite count of the first band based on the write command, and when the first rewrite count exceeds a first rewrite threshold, perform a read-modify-write (RMW) operation for all of the first band.

In yet another embodiment, a device may comprise a processor configured to receive a write command directed to a first band of shingled tracks on a data storage medium, wherein storing data associated with the write command only requires writing a portion less than all of the shingled tracks, increment a first write count of the first band based on the write command, and when the first write count exceeds a first threshold, perform a first read-modify-write operation to store the data associated with the write command by rewriting all of the shingled tracks of the first band instead of only the portion less than all.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
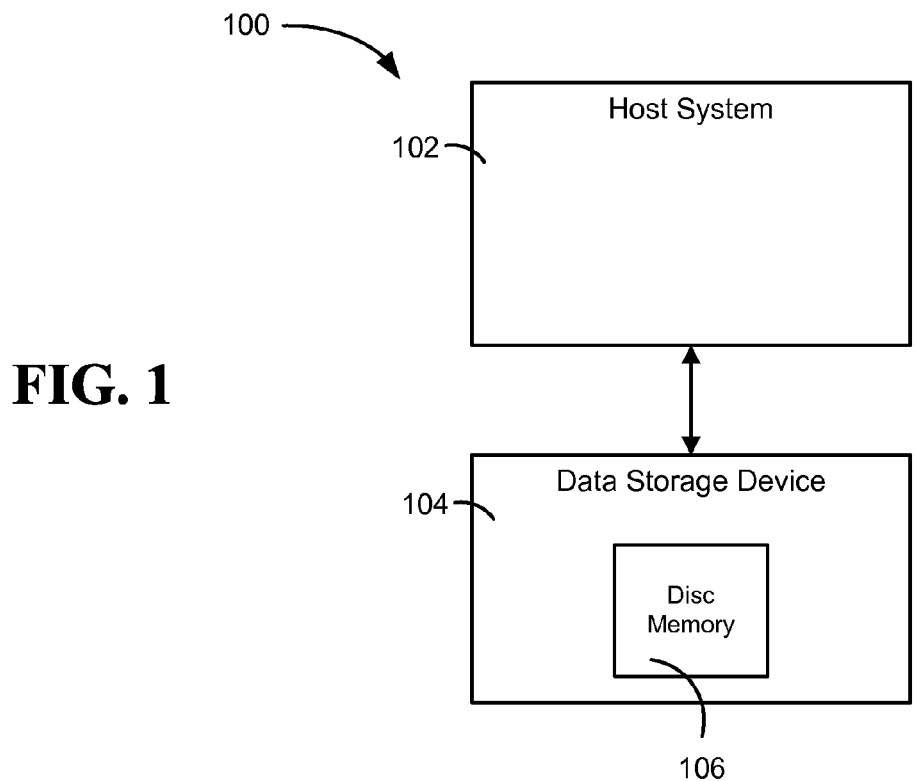
FIG. 1 is a diagram of an illustrative embodiment of a system of band rewrites based on error scan counts.

FIG. 1 depicts an embodiment of a system for band rewrites based on error scan counts, generally designated 100. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102, or the host 102 and DSD 104 may both be part of a single unit.

The DSD 104 can include one or more nonvolatile memories 106. In the depicted embodiment, the DSD 104 is a hard disc drive (HDD) including a rotating disc memory 106. In other embodiments, the DSD 104 may contain additional memories or memory types, including volatile and nonvolatile memories. For example, DSD 104 could be a hybrid HDD with both a disc memory and a nonvolatile solid state memory.

In some embodiments, DSD 104 may have one or more discs 106 having tracks for storing data. A disc 106 may be divided into multiple zones each with a plurality of tracks. Each zone may have different configurations of various options, such as data track format, direction of writing from a transducer (e.g. outer diameter to inner diameter), data density, or intended uses. For example, a disc may have a zone designated as a media cache intended for sequential storage of data in a non-shingled track manner. The disc may also have one or more zones designated for data storage in a shingled track manner using shingled magnetic recording (SMR) as discussed below. The disc may further have at least one zone designated for spare sectors.

In an embodiment of system 100, the disc memory 106 has one or more zones configured to store data on shingled data tracks using SMR. SMR is a recording method used to increase data recording density on a disc, whereby a track of data partially overlaps an adjacent data track. SMR will be discussed in more detail with regard to FIGS. 2-4.

Figure 2:
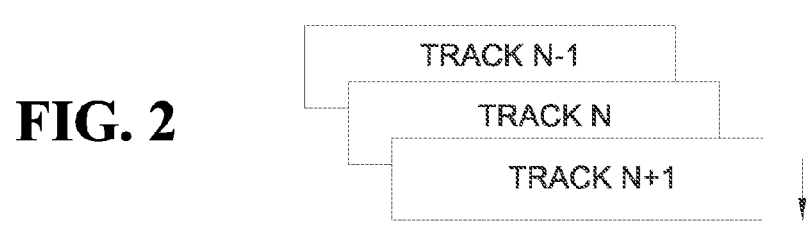
FIG. 2 is a diagram of another illustrative embodiment of a system of band rewrites based on error scan counts.

SMR is a scheme of executing a write operation in one radial direction across a disc, where tracks partially overlap each other similar to roofing shingles. Referring to FIG. 2, if it is assumed that writing is performed in the arrow-indicated direction in the shingle-write scheme, when writing is performed on track N, adjacent track N−1 is partially overwritten. Similarly, when writing is performed on track N+1, adjacent track N is partially overwritten. In contrast to recording methods where each track is written without any overlap, SMR may result in increased recording density due to a higher tracks per inch (TPI) characteristic in a radial direction of a storage medium.

Figure 3:
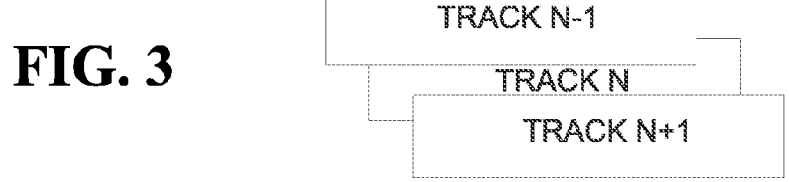
FIG. 3 is a diagram of another illustrative embodiment of a system of band rewrites based on error scan counts.

As illustrated in FIG. 3, after writing on track N, if track N−1 is written in a reverse direction of the shingled recording direction, track N may become unreadable due to Adjacent Track Interference (ATI), or being partially overwritten by both adjacent tracks. Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time.

Figure 4:
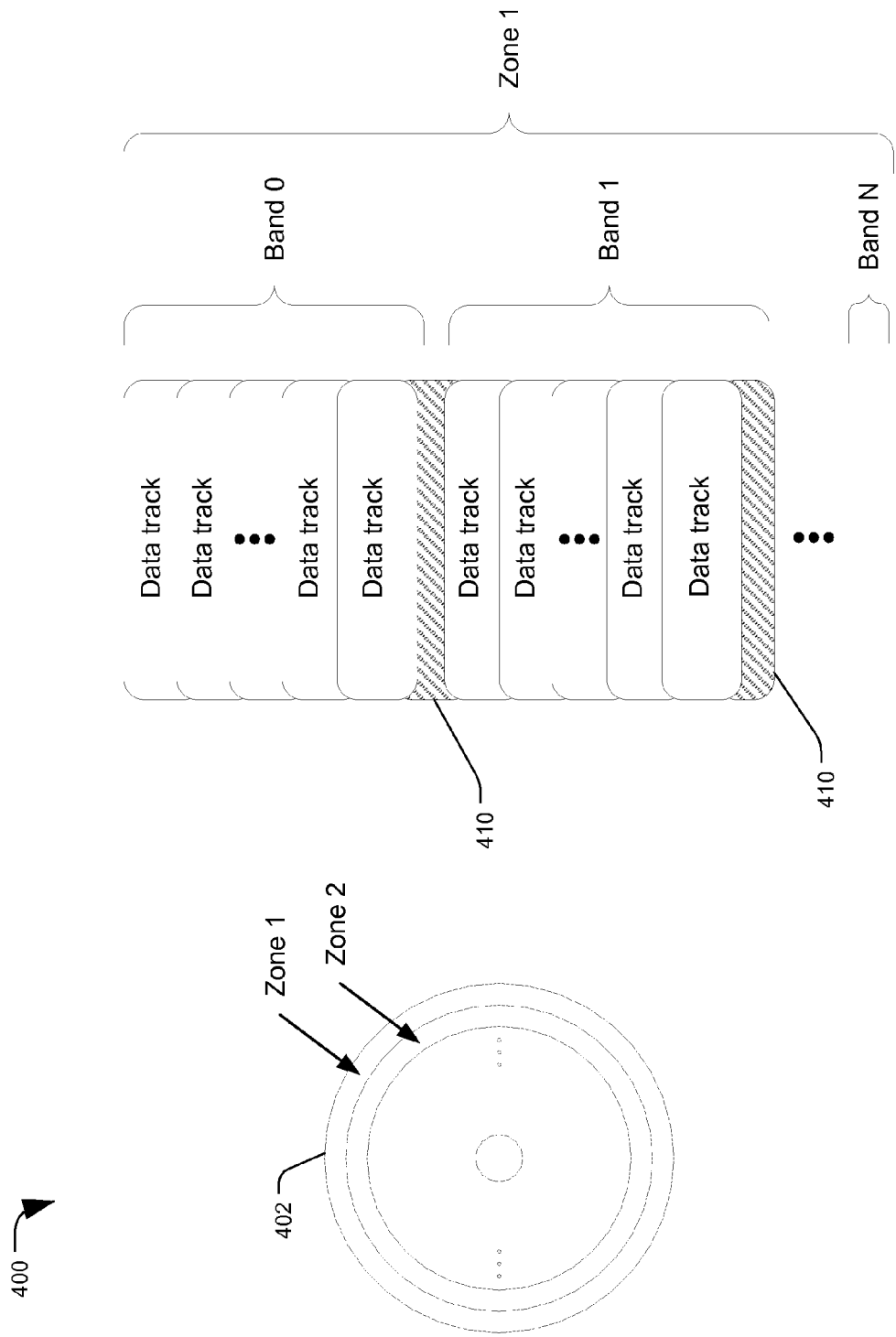
FIG. 4 is a diagram of another illustrative embodiment of a system of band rewrites based on error scan counts.

Turning now to FIG. 4, a diagram of another illustrative embodiment of a system of band rewrites based on error scan counts is depicted and generally designated 400. Rotating disc media 402 may be divided into a plurality of zones (e.g. Zone 1, Zone 2, etc.). Each zone may contain a plurality of data tracks. Different zones may be designated for different purposes; for example, some zones may be designated for shingled recording, and other zones may be designated for non-shingled recording.

Due to the single-write direction of SMR, writing a given track N−1 after track N has been written may require rewriting all shingled tracks that following track N−1 (i.e. track N, track N+1, track N+2, etc.). In order to accomplish this realistically, a set of tracks may be grouped into a "band," with the band ending with a guard track or guard area 410. In some embodiments, the guard track 410 can be a non-shingled track, or one or more shingled tracks not used to store data. When track N−1 needs to be re-written, tracks N−1 to the guard track can be rewritten, while tracks in other bands are not affected, because the guard track is not written or does not partially overlap other tracks. Accordingly, the tracks in a shingled zone may be divided into a plurality of bands. As depicted in FIG. 4, Zone 1 may contain Band 1 through Band N. In an example embodiment of a disc with multiple bands per zone, each zone may contain 110 tracks, and the 110 tracks may be divided into 10 bands containing 10 data tracks and 1 guard track each. Each track can be further divided into a plurality of logical block addresses (LBAs), with chunks of data written to each LBA.

Returning to FIG. 1, in some examples DSD 104 may receive data from host 102 to be stored to a disc storage medium 106 that has a shingled track zone. In some embodiments, to write to a shingled track zone, a device may read data from the target band, modify the data that is to be updated, and then write the band with the modified data. This can be referred to as a read-modify-write (RMW) operation, or more specifically for shingled bands of SMR devices, a banded read-modify-write operation (bRMW). A RMW operation on a shingled band can be more time consuming than non-shingled write commands. Instead of simply writing the tracks containing the new data directly, the DSD must write those tracks as well as all the remaining tracks up to the guard track of a band.

How much of a band needs to be rewritten in a RMW operation may change depending on where the data to be modified is located within the band. For example, if only the last track of a band needs to be modified, a RMW operation may only involve reading and modifying that last track, since there are no shingled tracks following the last track that may be corrupted by ATI. However, if the data to be modified is in the first track of a band, every track of the band will need to be read and rewritten as part of the RMW operation.

For example, a full bRMW may include reading the entire band, modifying the appropriate data, and then re-writing the band with the modified data. A partial bRMW may include reading only the portion of the band having the data that is to be modified up through the guard track, then modifying and re-writing the modified data to that end portion. A partial bRMW may not read and re-write a portion of the band that does not include data to be modified. For example, if the data to be modified is on track 4 of a band, the bRMW may include performing a RMW on tracks 4 through N, while leaving tracks 0-3 unread or modified.

After receiving data to be written, the DSD may first write all designated data to a cache of a non-volatile data storage medium, such as a Flash-based cache or a media cache on an unshingled area of a disc memory. For example, data may be stored to a media cache zone in a sequential fashion to allow the data to be efficiently stored without having to rewrite a shingled track zone corresponding to an intended destination of the data. The data can then be moved from the cache to shingled bands at a later point, which may avoid rewriting a band every time data for the band is received or updated. For example, some files may be updated frequently, or several write commands for the same band may be received, which can all be performed in a single RMW operation. This can allow greater throughput of storing data to the data storage device than if the data storage device had to write data to a shingled track zone every time a write request from the host occurred.

As discussed, data may be recorded to concentric circular tracks of storage media such as magnetic discs. When data is written to a track, sector, shingled recording band, a portion of a band, or other area of a disc, a counter can be incremented. When the counter exceeds a threshold value, an error scan may be performed on the track or area of the disc. The error scan may include performing diagnostics and error correction, such as reading the written data, detecting and correcting errors in the written data, and re-writing the corrected data. These diagnostics can detect errors in writing as well as potential errors with the recording media itself, such as bad sectors. Performing an error scan on a regular basis may prevent data quality degradation due to repeated writes in an area of the disc, for example from ATI due to off-track magnetization.

According to embodiments of SMR described above, when data must be corrected and rewritten in a given band, much or all of the band may need to be rewritten in accordance with the shingled writing scheme. Therefore when an error scan detects errors in shingled recording bands, correcting the errors may involve reading the entire band, correcting errors, and rewriting the band, rather than simply correcting and rewriting only the data sectors containing errors. Performing an error scan may consume resources of a data storage medium, such as energy and processing time, which can cause performance inefficiency. For example, delays caused by scanning and rewriting a band may cause commands received from a host to timeout if they are not serviced in time. In some instances it may be inefficient to perform the error scan, and may be more efficient to bypass the scan and proceed to rewrite the shingled recording area without the scan. For example, a RMW operation may already involve correcting errors in data during the reading and rewriting process, thereby eliminating the need to perform a separate scan to find and correct errors.

Rewriting a shingled band may be accomplished in different ways. All the data that has been written to a band may still be stored in a cache memory due to a recent write command, and therefore the entire band may be rewritten directly from the cache memory without the need to read the written data from the band and correct errors. In other embodiments, data may be read from the band, errors may be corrected, and the data rewritten, but the error scan can still be bypassed.

In some embodiments, an error scan may be performed after reaching a threshold of M writes to a band. A device employing the system for band rewrites based on error scan count may be configured to rewrite the band when the error scan count reaches an M−1 threshold, and the error scan count for the band can be reset. In a slight variation, after the M−2 threshold is passed, the next write to the band can be set to write the entire band, regardless of how much of the band would normally need to be rewritten for the write command itself. In some embodiments, thresholds may be based on a percentage of an area or band written, the amount of data written, the number of sectors written, or some other parameter. Forcing a rewrite based on a lower threshold than the error scan threshold results in rewriting the band and resetting the counter before reaching the error scan threshold, thereby bypassing the error scan. Bypassing error scans may prevent the diagnostics from erroneously marking regions of the disc as "bad" merely due to errors from off-track writing, which errors can be more prevalent with dense recording methods such as shingled recording. In addition, forcing band rewrites in this manner may reduce in-band ATI and allow a higher track pitch.

In some embodiments, error scans may still be performed on a given area of a storage media. For example, when data is written to a track, sector, shingled recording band, portion of a band, or other area of a disc, a counter can be incremented for that area, and the counters for adjacent or nearby areas can also be incremented. In some embodiments, the counter for the band being written is increased by a first amount (e.g. increased by 5 for each write), while the counters for adjacent bands may be increased by a second amount, third amount, etc. (e.g. for each write, the counters for immediately adjacent bands are increased by 3, the and the counters for the next farther bands are increased by 1). So, for example, if a given band is being written repeatedly, the error scan counters for that band and both adjacent bands may be incremented with each write. The error scan for the written band may be bypassed using the method described herein, but if no write is performed to the adjacent bands before their own error scan count thresholds are passed, error scans may be performed on those adjacent bands. In some embodiments, a system may be configured to bypass the error scan for the adjacent bands in the same manner that the scan is bypassed for the band being written.

In some embodiments, an error scan counter for a band may be reset every time the entire band is rewritten, regardless of whether a force-rewrite threshold is reached.

Figure 5A:
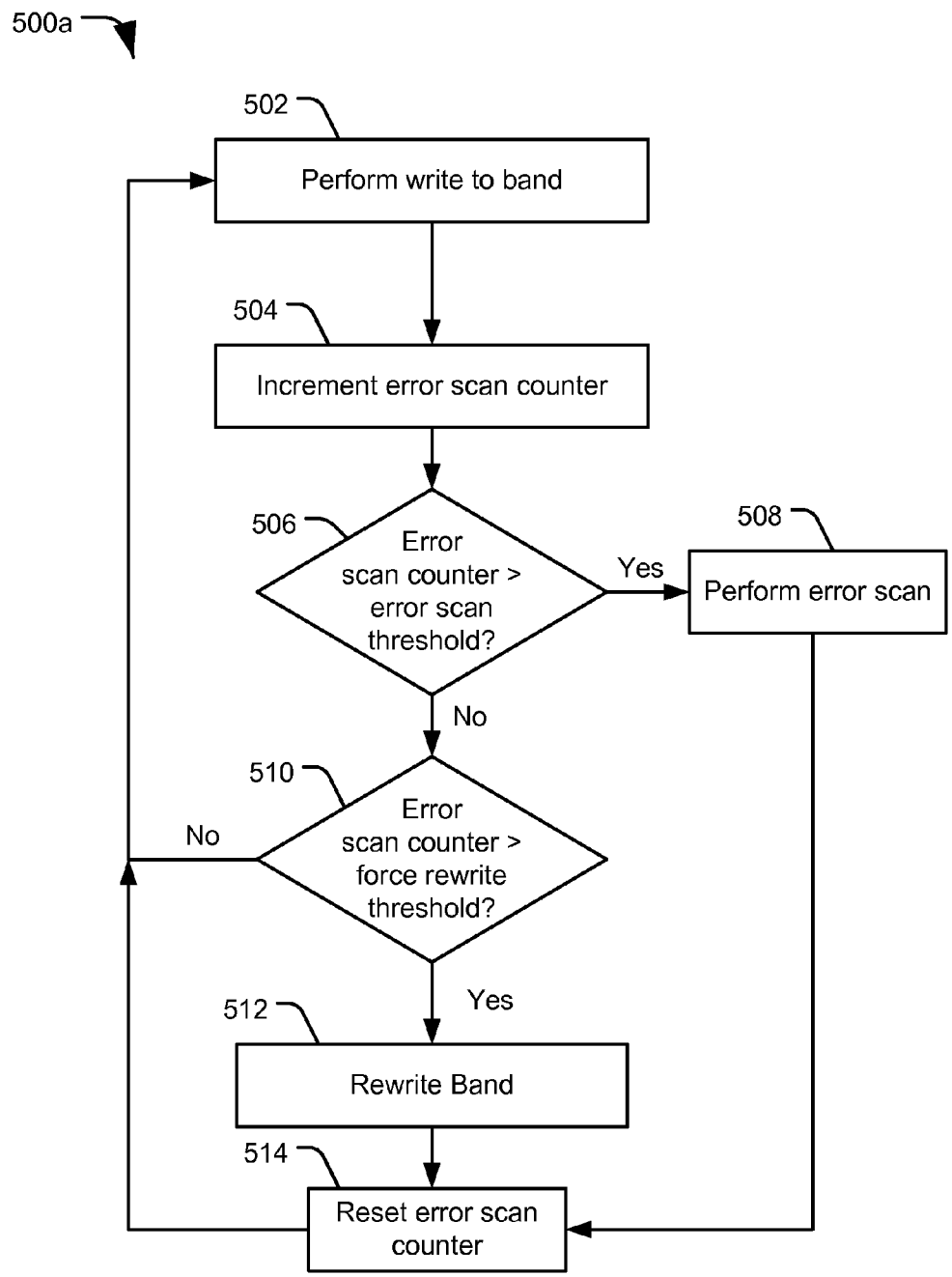
FIG. 5a is a flowchart of an illustrative embodiment of a method employing band rewrites based on error scan counts.

Turning to FIG. 5a, a flowchart for an illustrative embodiment of a method of band rewrites based on error scan counts is shown and generally designated 500a. A system performs a write to a band, at 502. The system increments the error scan counter, at 504. At 506, the system performs a check for whether the error scan counter exceeds the error scan threshold. If the error scan counter does exceed the threshold, the system performs an error scan at 508, and resets the error scan counter at 514. This may occur if, for example, the error scan counter for the band had been increased due to writes to adjacent tracks or bands, thereby not triggering the force-rewrite threshold.

If the error scan counter does not exceed the error scan threshold at 506, the system may determine whether the error scan counter exceeds the force rewrite threshold, at 510. As discussed, the force rewrite threshold would be lower than the error scan threshold, and would be reached before the error scan threshold. If the force rewrite threshold had not yet been reached at 510, the system would wait for the next write to the band at 502. If the force rewrite threshold had been reached at 510, the system may rewrite the entire band, at 512. The error scan counter may then be reset, at 514.

In another embodiment, a forced band rewrite may not be performed if, for example, the system is busy processing host commands. In such embodiments, the error scan threshold may be passed before performing a force-rewrite, at which point an error scan may be scheduled to be performed during an idle period, or the error scan may be performed before further host commands are processed. This is another example where the error scan threshold may be reached at 506 of FIG. 5a before the force rewrite is performed.

Figure 5B:
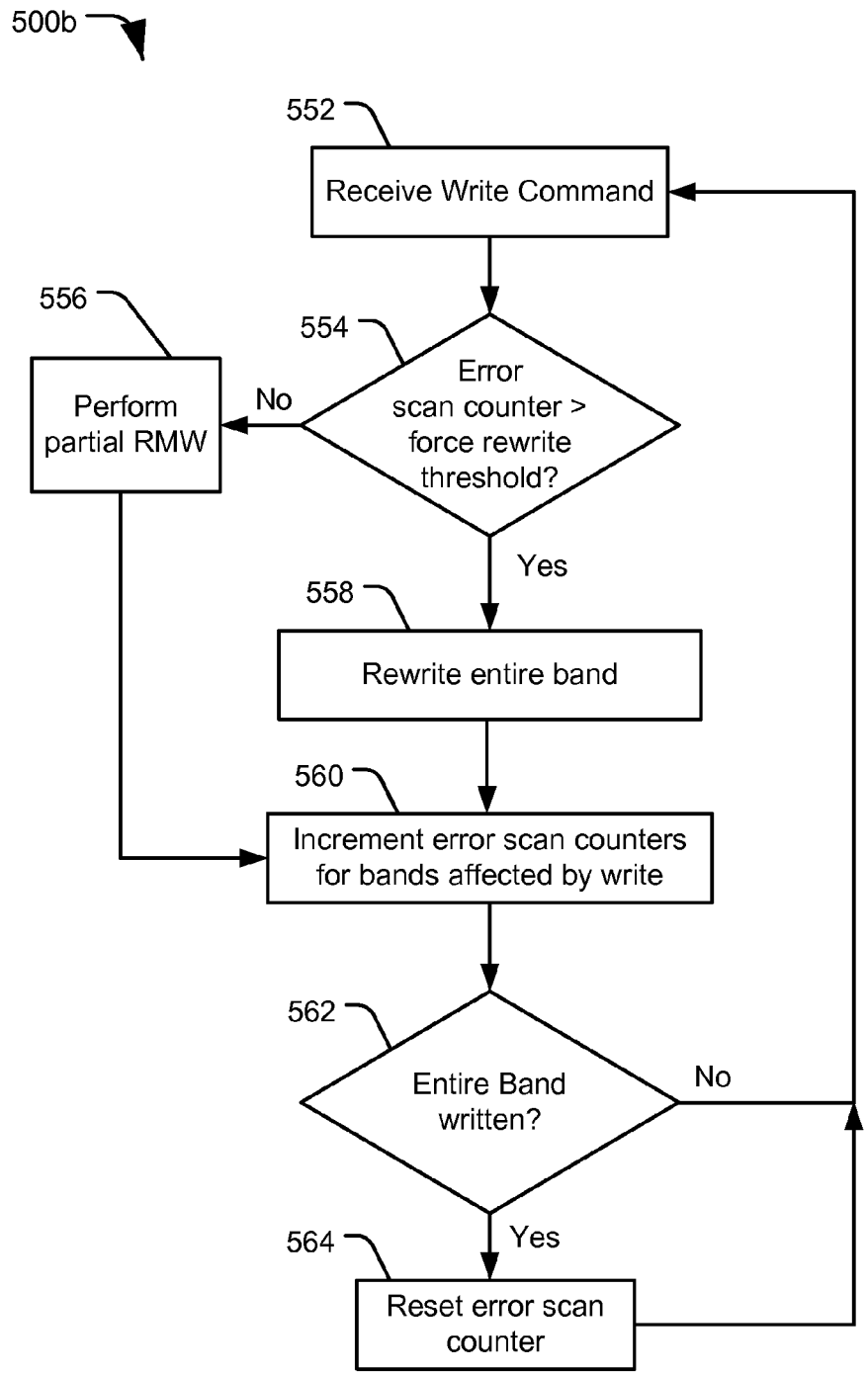
FIG. 5b is a flowchart of an illustrative embodiment of a method employing band rewrites based on error scan counts.

Turning to FIG. 5b, another flowchart for an illustrative embodiment of a method of band rewrites based on error scan counts is shown and generally designated 500b. The method may involve receiving a write command directed to a shingled recording band of a data storage device, at 552. The method may involve determining whether an error scan counter value for a target band of the write command exceeds a force rewrite threshold, at 554.

If the error scan counter is not higher than a force rewrite threshold, at 554, the method may involve performing a partial read-modify-write (RMW) operation, and only write a portion of the band to store the data associated with the write command, at 556. If the error scan counter does exceed the force rewrite threshold, the method may involve performing a full RMW on the entire band, including writing the data associated with the write command, at 658.

After performing a partial RMW at 556, or a full RMW at 558, the method may involve incrementing error scan counters for bands affected by the write, at 560. For example, this may include incrementing the counter for the target band of the write command as well as counters for nearby bands that may receive interference from writing to the target band. In some embodiments, the current band's counter may only be incremented after performing a partial RMW.

The method may next determine whether the entire target band has been written, at 562. If not, the method may return to waiting for a next write command, at 552. If the entire band was rewritten, the method may reset the error scan counter for the band at 564. The method may then wait for additional write commands, at 552.

Figure 6:
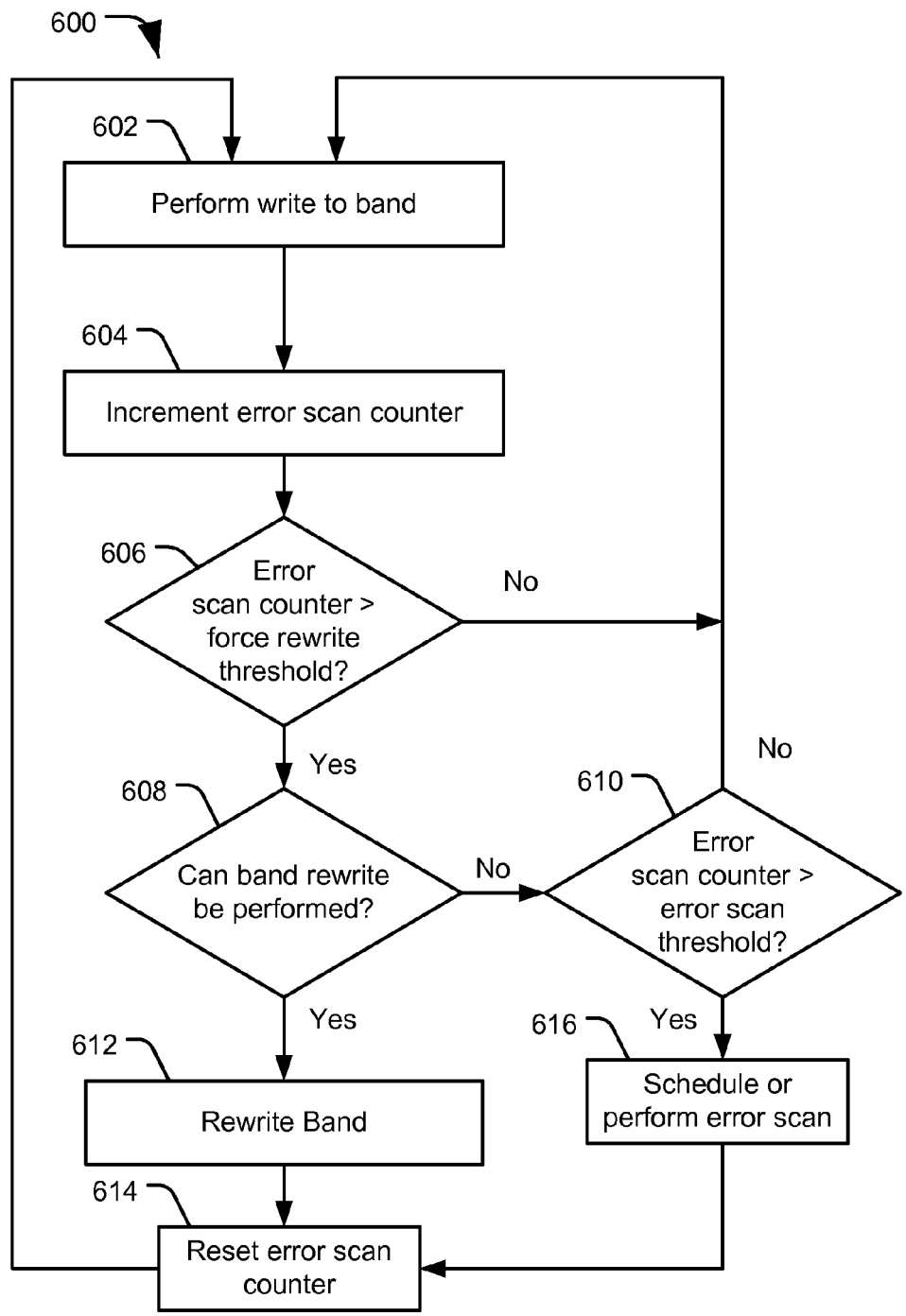
FIG. 6 is a flowchart of another illustrative embodiment of a method employing band rewrites based on error scan counts.

For another example, FIG. 6 depicts another illustrative embodiment of a method for band rewrites based on error scan counts, generally designated 600. A system performs a write to a band, at 602, and increments the error scan counter, at 604. This can include incrementing one or more counters for the band being written, as well as counters for nearby tracks or bands. In this embodiment, the system may first determine whether the error scan counter exceeds the force rewrite threshold for each affected area, at 606. If not, the system waits for the next write command, at 602. If the error scan counter does exceed the force rewrite threshold, at 606, the system may then determine whether a band rewrite can be performed, at 608. For example, the system may examine a current workload from a host to determine whether a rewrite can be performed without causing command timeouts. If a rewrite can be performed, the system may rewrite the band at 612, and reset the error scan counter at 614.

If a band rewrite cannot currently be performed, at 608, the system may determine whether the error scan counter has exceeded the error scan threshold, at 610. If not, the system may move on to the next write command, at 602. If the error scan threshold has been exceeded, the system may schedule an error scan for the band to be performed when the system is not busy, or it may interrupt other commands to perform an error scan immediately, at 616. The error scan counter may then be reset, at 614.

Figure 7:
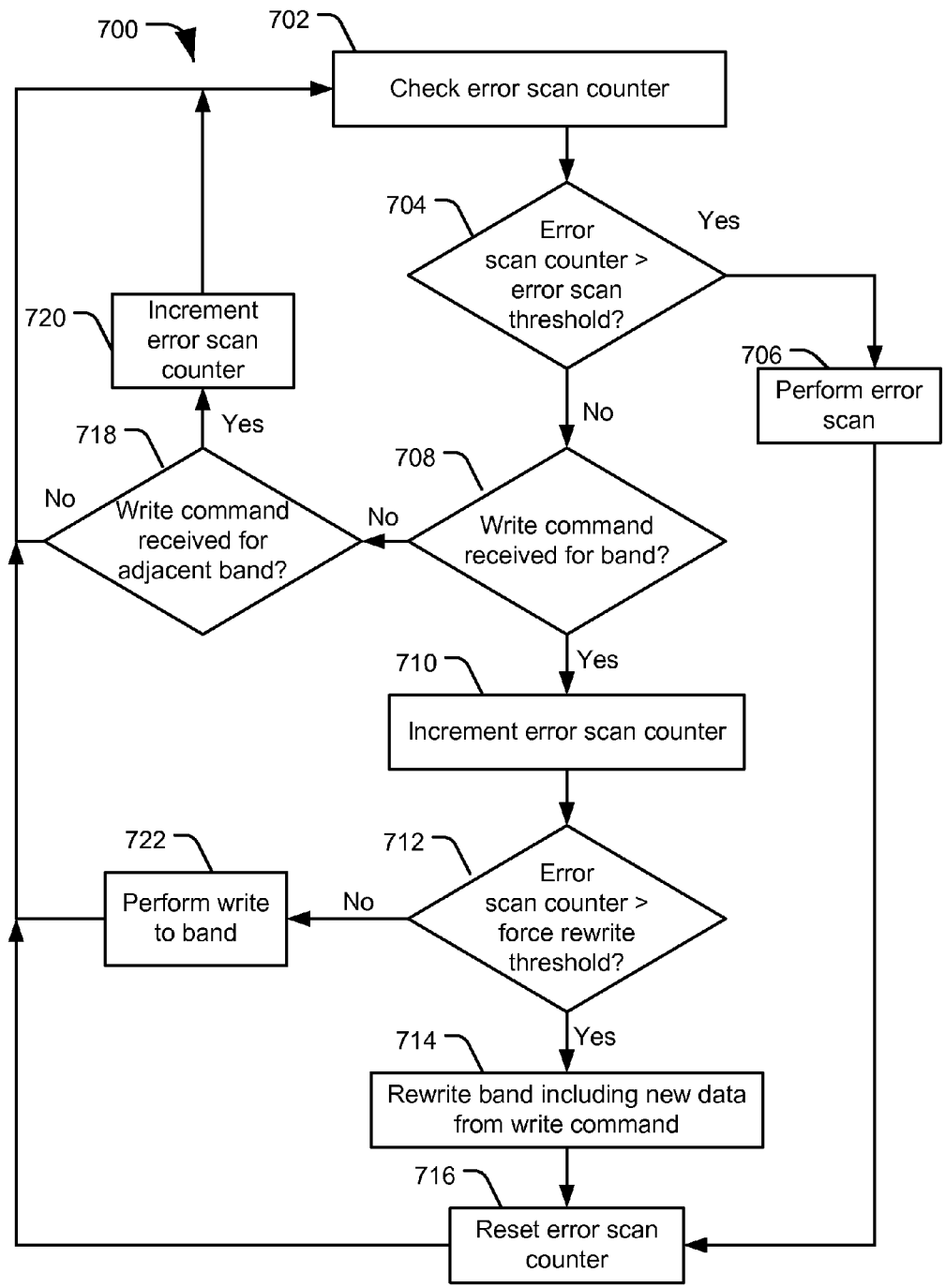
FIG. 7 is a flowchart of yet another illustrative embodiment of a method employing band rewrites based on error scan counts.

FIG. 7 depicts yet another illustrative embodiment of a method for band rewrites based on error scan counts, generally designated 700. The method 700 may involve a system checking an error scan counter for a band, at 702. The system may next determine whether the error scan counter exceeds the error scan threshold, at 704. If the error scan threshold is exceeded, the system may perform an error scan at 706, and reset the error scan counter at 716.

If the error scan counter does not exceed the error scan threshold at 704, the system may determine whether a write command has been received for the band, at 708. If not, the system may determine whether a write command was received for an adjacent band, at 718. If not, the system may wait for the next operation. If a write command was received for an adjacent band, the system may increment the error scan counter for the current band, at 720, and wait for the next operation.

If a write command has been received for the current band, at 708, the system may increment the error scan counter for the current band at 710. As discussed herein, the error scan counter may be incremented by different amounts at 710 and 720, depending on whether a write command was received for the current band or an adjacent band. For example, a write to the current band may increment the counter by 3, while a write to an adjacent band may increment the counter by 1.

The system may next determine whether the error scan counter exceeds the force rewrite threshold, at 712. If not, the system may write to the band normally, at 722, e.g. by rewriting only as many tracks as necessary. If the error scan counter does exceed the force rewrite threshold at 712, the system may rewrite the entire band, incorporating the new data from the write command, at 714. The system may then reset the error scan counter, at 716.

Figure 8:
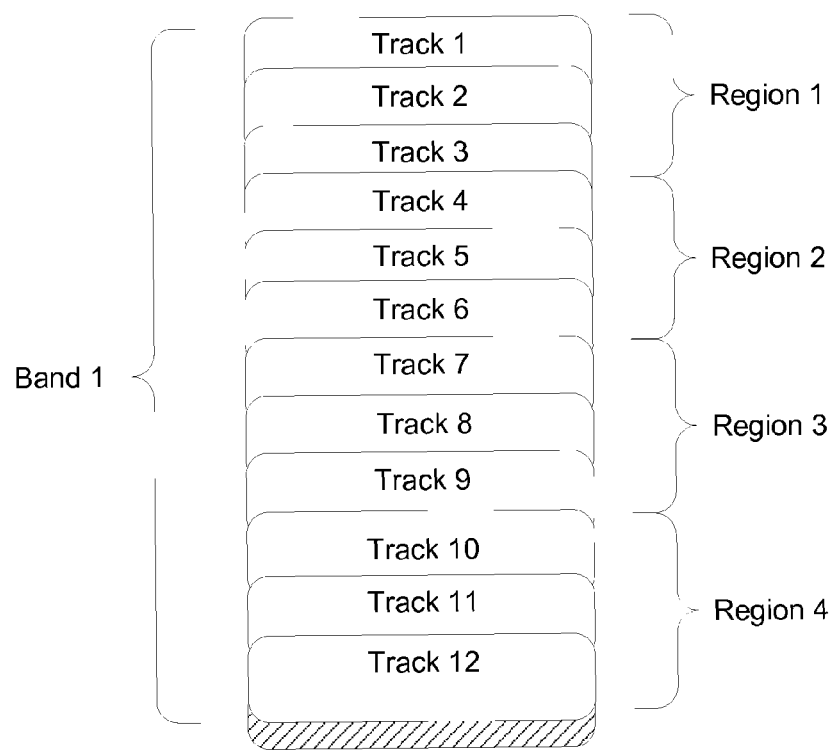
FIG. 8 is a diagram of another illustrative embodiment of a system of band rewrites based on error scan counts.

Turning now to FIG. 8, a diagram of another illustrative embodiment of a system of band rewrites based on error scan counts is depicted and generally designated 800. In some embodiments, a device may maintain multiple counters for each band. For example, Band 1 of FIG. 8 may include 12 data tracks, with the band divided into 4 regions of 3 tracks each. The regions may also be referred to as "sections." Regions may different sizes between different devices, memories of a single device, between bands, or in other combinations. For example, regions may include multiple tracks, a single track, or even portions of a track such as a half-track region. A data storage device may maintain a counter, such as an error scan counter, for each region of a band.

Receiving a write command directed to a data track in region 4 may require only performing a partial bRMW to read-modify-write data in the last region. A write command for region 3 may require performing a RMW on regions 3 and 4. Receiving a write command directed to region 1 may require a full bRMW to region 1 through 4.

Counters for these sections may be handled similarly to the error scan counters described elsewhere. For example, performing a write to region 4 may increment a counter for region 4 as well as for adjacent region 3, possibly incrementing the regions by different amounts. In some embodiments, writing to a region may increment counters for a specified number of adjacent regions preceding the writing region, or to each side of the written region, such as 3. So if a write is performed to region 1 of Band 2, write counters may also be incremented for regions 2, 3, and 4 of Band 1. Similarly, writing to region 4 of Band 1 may also increment counters for regions 1, 2, and 3 of an adjacent Band 2. In some embodiments, writes to one region may only affect one adjacent region or less. For example, assume each region includes ten tracks. A write command directed to the first five tracks of region 2 may require incrementing a counter for region 1, while a write command directed to the last five tracks of region 2 may not involve incrementing the region 1 counter. In an example with half-track regions, writing to the second half of track 2 may only increment a counter for the second half of track 1 rather than all of track 1. Region-based counters may trigger performing an error scan or RMW on portions of a band instead of a whole band, which may save device resources.

In an example, when a write command is received for region 3, the write counter for region 3 may be incremented by a first amount, and the write counter for region 2 may be incremented by a second amount. The device may determine whether a force rewrite threshold is reached for region 2, and if so, may perform a RMW from region 2 through the end of the band, including writing the data to region 3. This may also involve incrementing a counter for region 1, since region 2 was written. The device may reset the counters for region 2 through the end of the band because those regions were completely rewritten. If the force rewrite threshold for region 2 is not reached, the device may only perform a RMW on region 3 to the end of the end of the band to write the data from the write command. The device may also reset the counters for regions that were rewritten.

In an example, each region may include ten tracks, and a write command may be received which is directed to the last five tracks of region 2. A counter for region 2 may be incremented. In this example, only writes to the top five tracks of a region result in incrementing a counter for the preceding region, so region 1's counter is not incremented at this point. If region 2's counter does not exceed a rewrite threshold, a RMW may be performed that starts at the data to be written and ends at the end of the band. If region 2's counter does exceed a rewrite threshold, all of region 2 may need to be rewritten. Because rewriting all of region 2 would require writing the first five tracks of region 2, region 1's write counter may also be incremented. The counter for region 1 may also be compared against a rewrite threshold, which may result in the RMW including all of region 1 in addition to region 2.

In some embodiments, multiple thresholds may be employed for each region. For example, there may be a full rewrite threshold for a region, as well as a lower threshold for partial rewrites. Reaching a partial rewrite threshold may trigger rewriting a portion of a region instead of the whole region. Returning to the example of regions having ten tracks each, a write command may be receive directed to the first five tracks of region 3. Region 3's counter may be incremented, as well as region 2's counter. If region 2's counter does not exceed a threshold, only region 3 and lower regions may be rewritten. If region 2's counter exceeds the partial rewrite threshold, the lower five tracks of region 2 may be rewritten in addition to all following regions of the band. Region 2's counter might not be reset, as the full region was not rewritten. If region 2's full rewrite threshold is exceeded, all of region 2 may be scheduled for rewriting, and region 1's counter may also be incremented. The same counter analysis may be performed for region 1.

In some embodiments, whether to increment a counter for an adjacent region, and how many tracks to rewrite from that region, may be based on a distance from tracks which will be written. For example, a write count may be incremented within five tracks of a track involved in a write operation. Returning to the ten-track sector example again, receiving a write command directed to track 6 of region 2 may not increment the write counter for region 1 because track 6 is not within five tracks of region 1. If the write command is directed to track 2 of region 2, the counter for region 1 may be incremented. Similarly, if a write command is received for track 2 of region 2, and the partial rewrite threshold of track 1 is exceeded, the RMW operation may start with track 7 of region 1, as track 7 of region 1 is five tracks from track 2 of region 2.

Figure 9:
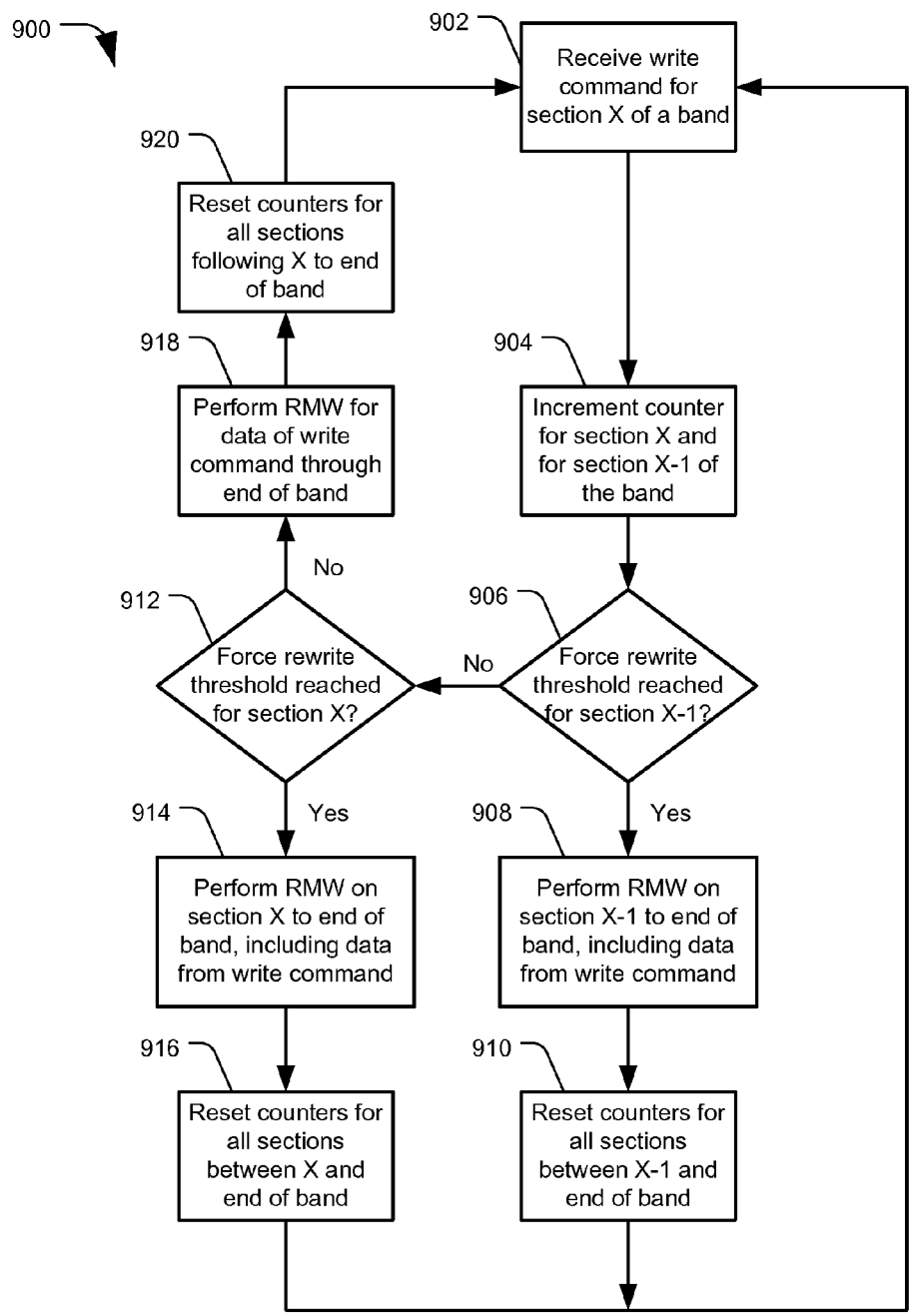
FIG. 9 is a flowchart of yet another illustrative embodiment of a method employing band rewrites based on error scan counts.

FIG. 9 depicts yet another illustrative embodiment of a method for band rewrites based on error scan counts, generally designated 900. The method 900 may include receiving a write command for region or section X of a band, at 902. For example, section X may correlate to one of the sections of Band 1 from FIG. 8.

At 904, the method may include incrementing a counter for section X, such as an error scan counter or rewrite counter, and also incrementing a counter for a section X−1 of the band. For example, if the write command was directed to section 3 of Band 1 of FIG. 8, a rewrite counter may be incremented for section 3 and also for section 2. In some embodiments, the counter for section X may be incremented by a first amount (e.g. by 3) while the counter for section X−1 may be incremented by a second amount (e.g. by 1). In some embodiments, counters may also be incremented for sections X−2, X−3, etc., or for sections X+1, X+2, etc. In some embodiments, the counter for section X−1 may only be incremented if the write command includes certain tracks of section X, such as the top n tracks. In some embodiments, counters for sections from adjacent bands may also be incremented. For example, if a data write was received for section 1 of Band 1 of FIG. 8, a write counter for the last section(s) of Band 0 may also be incremented.

The band may also have an overall error scan counter that is incremented any time a write command is received for a section of that band, or in some embodiments, when data is written to proximal bands. For example, each band may have individual section rewrite counters, and an overall error scan counter. According to some embodiments, individual sections may have lower rewrite thresholds based on the section counters, while the band has a higher force rewrite threshold and error scan threshold. In some embodiments, a band may only have section counters and an error scan counter, but not a force rewrite threshold for the total band. In some embodiments, the error scan counter for a band may be tied to the "first" or "top" section including the first n tracks of the band, because rewriting the first section requires rewriting the entire rest of the band. The band itself section may not have a separate rewrite counter in such embodiments. Other configurations of counters and band divisions are also possible.

The method 900 may include determining whether a force rewrite threshold has been reached for section X−1, at 906. In some embodiments, this may also include determining whether a force rewrite threshold (e.g. a full or partial rewrite threshold) has been reached for X−2, X−3, etc., or whether an overall force rewrite or error scan threshold has been reached for the band itself. In an example embodiment, the determination of 906 may first examine overall band thresholds, then the lowest-number sector of the band that has had its counter incremented, and then repeating the determination for each successively higher-number sector of the band.

If the force rewrite threshold has been reached at 906, the method may include performing a read-modify-write (RMW) on section X−1 through the end of the band, at 908. This can include reading the data from X−1 and all successive sectors through the end of the band, modify the data with the data from the write command, and write the modified data back to the band. In embodiments where the determination of 906 includes sections X−2, X−3, etc. the RMW may include those sections if their rewrite threshold has been reached. If an overall band threshold has been reached, a RMW may be performed on the entire band.

The method may then include resetting the counters for all sections involved in the RMW, at 910. For example, counters for all sections from X−1 through the end of the band may be reset. If an overall band force rewrite threshold was reached, the method may involve resetting both the band error scan counter as well as all individual section counters of the band. In embodiments with partial section rewrite thresholds, only those sections that were completely rewritten may have their counters reset. The method may include waiting for a next write command, at 902.

If the force rewrite threshold has not been reached for section X−1, at 906, the method may involve determining whether a force rewrite threshold has been reached for section X, to which the write command was directed, at 912. If the rewrite threshold for section X has been reached, the method may involve performing a RMW on all tracks in section X through to the end of the band to write the data associated with the write command, at 914. The method may include resetting all the counters for section X through to the end of the band, at 916.

Of the force rewrite threshold has not been reached for section X at 912, the method may include performing a RMW on the track or data sectors associated with the write command through to the end of the band, at 918. In some embodiments, this may not include rewriting the entirety of section X; only those sectors or tracks necessary to store the data from the write command. For example, if section X includes 10 tracks, the write command may only require rewriting the last two tracks of section X, as well as all sections following section X up to the end of the band.

The method may next include resetting counters for all sections that were completely rewritten during the RMW operation, at 920. For example, this may only include the sections following section X, or it may also include section X if section X was fully rewritten. The method may then return to waiting for a next write command, at 902. By only rewriting sections of bands based on usage, this may save time associated with rewriting an entire band when it only a portion of the band is being written regularly.

Some embodiments may employ multiple error scan thresholds. For example, a device may be configured to perform an error scan after 3,000 writes if the device is in an idle state (e.g. not processing commands from a host), and perform an error scan after 5,000 writes even when the device is not idle. Accordingly, there may be multiple force-rewrite thresholds as well, such as at 2,990 writes for idle states or 4,990 writes for non-idle states. In other embodiments, the force-rewrite threshold may only be checked when a device is not in an idle state, such as a 4,990 write threshold, and error scans can proceed as normal during idle periods. In yet another embodiment, a device may only have one error scan threshold, but the force-rewrite threshold may only be checked during non-idle periods. Error scan thresholds and force-rewrite thresholds may be set by a manufacturer, may be set or modified by a user, or may be dynamic based on a workload, commands from a host, or other factors.

While many of the examples and embodiments disclosed herein are directed toward shingled magnetic recording, forcing rewrites based on error scan counts can be employed in non-shingled media as well. The devices and methods disclosed would be beneficial to any system employing batch writing or rewriting, but can also be used in with any type of storage media to avoid performing diagnostic scans that may require correcting and rewriting data.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    a data storage medium including a plurality of bands, each band including:
        a first region including a first plurality of tracks recorded in a shingled manner where a first track at least partially overlaps an adjacent track, and writing to tracks in the first region requires rewriting tracks in a second region;
        the second region including a second plurality of tracks recorded in a shingled manner where a first track at least partially overlaps an adjacent track;
    a controller configured to:
        increment a first rewrite count for the first region when a write command is directed to the first plurality of tracks;
        rewrite the first region and the second region when the first rewrite count exceeds a first rewrite threshold;
        increment a second rewrite count for the second region when a write command is directed to the second plurality of tracks; and
        rewrite the second region when the second rewrite count exceeds a second rewrite threshold.

2. The device of claim 1 comprising the controller further configured to:
    increment the first rewrite count when a write command is directed to the second region.

3. The device of claim 2 comprising the controller further configured to:
    when a write command is directed to the second plurality of tracks and the first rewrite count exceeds a partial rewrite threshold less than the first rewrite threshold, rewrite the second region and tracks of the first region less than all of the first plurality of tracks.

4. The device of claim 3 comprising the controller further configured to:
    increment the first rewrite count when a write command is directed to a first selected number of tracks from the second plurality of tracks adjacent to the first region; and
    not increment the first rewrite count when a write command is directed to a second selected number of tracks from the second plurality of tracks not adjacent to the first region.

5. The device of claim 2 comprising the controller further configured to:
    increment a third rewrite count for a first band including the first region and the second region when a write command is directed to the first region or the second region; and
    rewrite the first band when the third rewrite count exceeds a third rewrite threshold.

6. The device of claim 5 comprising the controller further configured to:
    increment the third rewrite count when a write command is directed to a second band adjacent to the first band.

7. The device of claim 5 comprising the controller further configured to:
    determine whether the third rewrite count exceeds the third rewrite threshold, and rewrite all of the first band when the third rewrite count exceeds the third rewrite threshold;
    when the third rewrite count does not exceed the third rewrite threshold, determine whether the first rewrite count exceeds the first rewrite threshold, and rewrite the first region and the second region when the first rewrite count exceeds the first rewrite threshold; and
    when the first rewrite count does not exceed the first rewrite threshold, determine whether the second rewrite count exceeds the second threshold, and rewrite the second region when the second rewrite count exceeds the second rewrite threshold.

8. The device of claim 7 comprising the controller further configured to:
    when the third rewrite count does not exceed the third rewrite threshold, the first rewrite count does not exceed the first rewrite threshold, and the second rewrite count does not exceed the second rewrite threshold, rewrite tracks of the band from a track including addresses associated with data from the write command to a last track of the band.

9. The device of claim 1 comprising the controller further configured to:
    reset a rewrite count for a region when all tracks of the region are rewritten.

10. The device of claim 1 further comprising:
    rewriting a region includes:
        read all data stored to the region;
        modify the data based on any data received in a write command to obtain modified data; and
        write the modified data to the region.

11. A device comprising:
a processor configured to:
   receive a write command directed to a first band of a data storage medium, the first band including a plurality of tracks storing data in a shingled manner where a first track at least partially overlaps a second track;
   increment a first rewrite count of the first band based on the write command; and
   when the first rewrite count exceeds a first rewrite threshold, perform a read-modify-write (RMW) operation for all of the first band.

12. The device of claim 11 further comprising:
the data storage medium;
the first band further includes:
   a first region including a first plurality of tracks recorded in a shingled manner where a first track at least partially overlaps an adjacent track, and writing to tracks in the first region requires rewriting tracks in a second region;
   the second region including a second plurality of tracks recorded in a shingled manner where a first track at least partially overlaps an adjacent track;
the processor configured to:
   increment a second rewrite count for the first region when a write command is directed to the first plurality of tracks;
   rewrite the first region and the second region when the second rewrite count exceeds a second rewrite threshold;
   increment a third rewrite count for the second region when a write command is directed to the second plurality of tracks; and
   rewrite the second region when the third rewrite count exceeds a third rewrite threshold.

13. The device of claim 11 comprising the processor further configured to:
   reset the first rewrite count based on writing the rewrite data to the plurality of tracks.

14. The device of claim 11 comprising the processor further configured to:
   determine whether the first rewrite count exceeds a scan threshold higher than the first rewrite threshold;
   when the first rewrite count exceeds the scan threshold, perform an error correction scan on the first band and reset the rewrite count;
   when the first rewrite count does not exceed the scan threshold:
      determine whether a write command has been received directed to a second band adjacent to the first band;
      when the write command directed to the second band has been received:
         increment a second rewrite count of the second band based on the write command; and
         increment the first rewrite count of the first band based on the write command.

15. The device of claim 14 comprising the processor further configured to:
   when the first rewrite count exceeds a first rewrite threshold:
      determine whether the processor can perform the RMW operation without causing command timeouts;
      when the processor cannot perform the RMW operation without causing command timeouts, determine whether the first rewrite count exceeds a scan threshold higher than the first rewrite threshold; and
      when the first rewrite count exceeds the scan threshold, schedule an error correction scan on the first band.

16. A device comprising:
a processor configured to:
   receive a write command directed to a first band of shingled tracks on a data storage medium, wherein storing data associated with the write command only requires writing a portion less than all of the shingled tracks;
   increment a first write count of the first band based on the write command; and
   when the first write count exceeds a first threshold, perform a first read-modify-write operation to store the data associated with the write command by rewriting all of the shingled tracks of the first band instead of only the portion less than all.

17. The device of claim 16, comprising the processor further configured to:
   receive the write command directed to the first band, the first band including:
      a first region including at least a portion of a shingled track, and writing to the first region requires rewriting a second region;
      the second region including at least a portion of a shingled track;
   increment a second write count for the first region when the write command is directed to the first region;
   increment the second write count for the first region and a third write count for the second region when the write command is directed to the second region;
   rewrite the first region and the second region when the second write count exceeds a second rewrite threshold; and
   rewrite the second region when the third write count exceeds the second rewrite threshold.

18. The device of claim 17, comprising the processor further configured to:
   when the write command is directed to the second region, increment the second write count by a first quantity and the third write count by a second quantity.

19. The device of claim 17, comprising the processor further configured to:
   rewrite the second region including performing a second read-modify-write operation to store the data associated with the write command by rewriting all of the second region and all subsequent regions of the first band.

20. The device of claim 17, comprising the processor further configured to:
   when the first write count does not exceed the first rewrite threshold, and the second rewrite count and third rewrite count do not exceed the second rewrite threshold, perform a third read-modify-write operation to store the data associated with the write command by rewriting all of the shingled tracks of the first band from a track including addresses associated with data from the write command to a last track of the band.

* * * * *